United States Patent [19]
Hale

[11] 3,789,879
[45] Feb. 5, 1974

[54] SELF-ADJUSTING SEALING APPARATUS
[75] Inventor: Elden A. Hale, Pikesville, Md.
[73] Assignee: Koppers Company, Inc., Pittsburgh, Pa.
[22] Filed: Apr. 20, 1972
[21] Appl. No.: 245,880

[52] U.S. Cl............. 137/614.11, 251/214, 251/329
[51] Int. Cl............................................ F16k 25/00
[58] Field of Search ....... 251/214, 329; 277/DIG. 7; 137/614.11

[56] References Cited
UNITED STATES PATENTS

| | | | |
|---|---|---|---|
| 2,891,762 | 6/1959 | Kellogg | 251/329 X |
| 3,458,172 | 7/1969 | Burrows | 251/214 X |
| 3,259,358 | 7/1966 | Tripoli | 251/214 |
| 2,567,527 | 9/1951 | Parks | 251/214 X |
| 3,206,162 | 9/1965 | Bogot | 251/214 X |

Primary Examiner—Harold W. Weakley
Attorney, Agent, or Firm—Boyce C. Dent; Olin E. Williams; Oscar B. Brumback

[57] ABSTRACT

A self-adjusting sealing apparatus for sealing a space between the wall of an enclosure and an irregular surface on a closure gate which moves substantially perpendicularly through the enclosure to block a flow of gas through the enclosure. A sealing element acts against the wall of the enclosure and the irregular surface thereby preventing gas within the enclosure from escaping between the wall and the closure gate. A resilient retaining mechanism urges the sealing element against the wall of the enclosure and against the irregular surface of the closure gate for maintaining the sealing element in sealing engagement with the wall and the irregular surface during movement of the closure gate into and out of the enclosure and when the gate is in any of its open, closed, or intermediate positions.

21 Claims, 5 Drawing Figures

SELF-ADJUSTING SEALING APPARATUS

BACKGROUND OF THE INVENTION

1. Field of the Invention

The present invention relates generally to closure seals for sealing a plurality of sealing surfaces or edges and more specifically to self-adjusting seals for sealing a space between a wall of an enclosure and an irregular surface movable through the enclosure.

2. Description of the Prior Art

With the advent of environmental awareness it has become increasingly important to eliminate as much as possible the pollutants that may be discharged into the atmosphere by industrial complexes. To eliminate these pollutants created by the exhaust gases of industrial furnaces, kilns, and the like, industrial gas cleaning apparatuses have been placed between the furnace, kiln, or the like and the exhaust stack. Their purpose of course is to clean the exhaust gases of pollutants prior to the gases being exhausted to the atmosphere.

Industry has found that it may be necessary to regulate or even stop the flow of gases from the furnace to the gas cleaning apparatus, from the gas cleaning apparatus to the exhaust stack, or from one portion of a gas duct system to another. One method to regulate or stop the flow of gas is to insert a slide gate enclosure into the duct work where it is desired to regulate the flow of gas. The slide gate enclosure has a closure that is movable into and out of the slide gate enclosure through a slot or space in one of its walls. The closure may be fully retracted to allow the maximum amount of gas to flow, it may be moved entirely into the enclosure thereby shuting off the flow of gas from one duct to another, or it may be positioned anywhere in between to regulate the amount of gas flowing from one duct to another.

In generations past it was unnecessary to be concerned with the space that is created between the wall of the enclosure and the movable closure, because most exhaust duct systems were operated with a subatmospheric pressure; therefore, gases would tend to remain within the duct system rather than escape to the atmosphere through the space and consequently sealing this space was of little concern.

Recently industry has been utilizing a positive pressure in their gas duct systems thereby causing concern as to unclean gases escaping to the atmosphere through the space between the enclosure and the closure. Various methods have been utilized to try and effectively seal this space against gases escaping to the atmosphere.

One such method is to secure two sealing elements to the movable closure so that they extend the entire width of the closure. The sealing elements are so positioned that when the closure is fully closed the sealing element abuts the wall of the enclosure and when the closure is fully opened another sealing element abuts the wall of the enclosure thereby preventing any gas from escaping through the space. This creates an effective seal when the closure is fully opened or fully closed, but this does not allow the closure to be positioned anywhere in between without gases escaping to the atmosphere through the space between the wall and the closure.

To try and counteract the above-noted disadvantage, the sealing element was placed against the wall of the enclosure and the closure and then secured to the wall when the closure was either in the opened or closed position. This method is an effective seal when the closure has a uniformly smooth surface. Do to adverse conditions inside a gas duct system, it has been found that it is virtually impossible to maintain a closure uniformly smooth. The tremendous heat of exhaust gases from furnaces and kilns will cause the closure to warp thereby causing its surface to become irregular. Other pollutants such as ash, acid, moisture, dirt, and other forms of exhaust waste will be deposited on the closure and will have an adverse affect on its surface. These pollutants will also cause irregularities to occur on the surface of the closure. As the irregular surface moves past the sealing element on its way into or out of the enclosure the sealing element, being stationary, will not conform to the numerous depressions and ridges in the irregular surface thereby allowing polluted gases to escape through the spaces that will exist between the sealing element and the irregular surface.

SUMMARY OF THE INVENTION

Accordingly, an object of the present invention is to provide a self-adjusting sealing apparatus that will overcome the aforementioned disadvantages and others; particularly for sealing a space between the wall of an enclosure means and an irregular surface on a closure means movable substantially perpendicularly through the enclosure means. Thus, this invention provides a sealing mechanism that is capable of following the contour of an irregular movable surface thereby ensuring that only a minute amount of gas will escape between the wall of the enclosure means and the irregular surface.

This is generally accomplished by providing a sealing means that acts against the wall and the irregular surface for preventing a fluid from escaping between the wall and the closure means from within the enclosure means and a resilient retaining means urging the sealing means against the wall and against the irregular surface for maintaining the sealing means in sealing engagement with the wall and the irregular surface during movement of the irregular surface into and out of the enclosure means.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
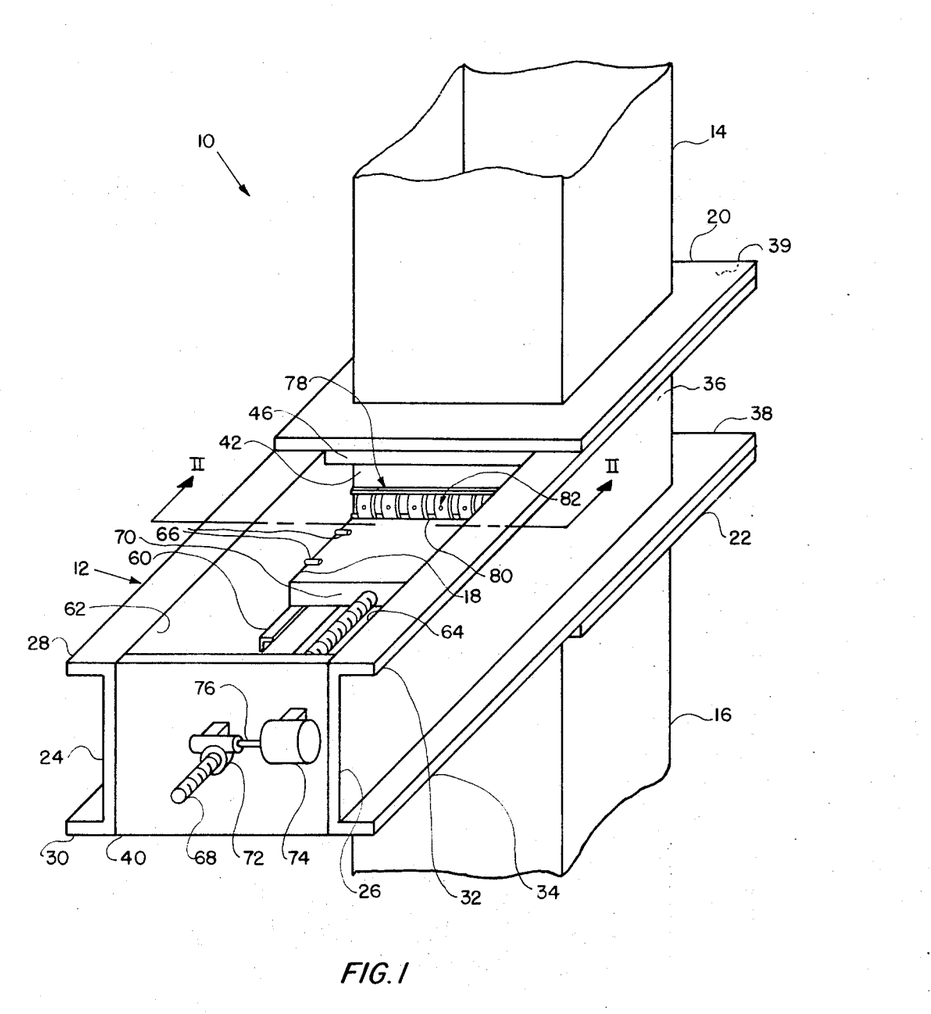
FIG. 1 is a perspective view of a slide gate enclosure positioned between two gas ducts with a closure movable through an opening in one wall of the enclosure between the self-adjusting sealing apparatuses of the present invention looking downward and to the left.

The present invention is generally shown in FIG. 1 as it is applied to a gas flow regulating system noted generally by numeral 10 wherein a fluid cut-off apparatus noted generally by numeral 12 is positioned between a pair of gas conduits 14 and 16. The fluid cut-off apparatus 12 utilizes a movable closure 18 that can be moved into or out of the space between conduits 14 and 16 thereby regulating the amount of fluid passing from one conduit to the other.

More specifically, the gas flow regulating system 10 comprises a gas conduit or duct 14 that has a flange 20 extending around its entire outer periphery and a second conduit or duct 16 with a flange 22 extending around its entire outer periphery. A fluid cut-off apparatus 12 includes a pair of side frames 24 and 26 each having a pair of flanges 28, 30, 32 and 34 respectively, a back frame 36 (FIG. 4) having a pair of flanges 38 and 39 is secured such as by welding between side frames 24 and 26, a front frame 40 is secured such as by welding between side frames 24 and 26, two center frames 42 and 44 (FIG. 4) having flanges 46 and 48 respectively are secured such as by welding between side frames 24 and 26 so that center frames 42 and 44 are axially aligned but having a space 50 between their end points 52 and 54 and at a point where the inside periphery of an enclosure 56 (FIG. 4) which is bounded by side frames 24 and 26, back frame 36, and center frames 42 and 44 is substantially the same dimension as the inside peripheries of ducts 14 and 16. A closure gate 18 whose width is substantially the same as the separation distance between side frames 24 and 26 and whose length is greater then the separation distance between back frame 36 and center frames 42 and 44 is movable between side frames 24 and 26 and is movable substantially perpendicularly through space 50 and into enclosure 56 so that end point 58 (FIG. 4) substantially abuts back frame 36 thereby separating one side of enclosure 56 from the other. A pair of support rails 60 (only one shown) are secured such as by bolting to the inboard surfaces 62 and 64 of side frames 24 and 26 extending to center frame 44. A support rail 61 surrounds the entire inner periphery of enclosure 56 and is aligned with surface 54 of center frame 44 and is secured thereto such as by bolting with bolts 100 and nuts 103 for supporting closure 18 as it moves into and out of enclosure 56 and to provide an effective seal against gas seepage between the inner periphery of enclosure 56 and the outer periphery of closure 18. A series of hold down rollers 66 are secured, such as by bolting along the inboard surfaces 62 and 64 slightly above closure 18 for insuring that closure 18 maintains its position on support rails 60 as closure 18 moves along support rails 60. A conventional jackscrew 68 is secured such as by welding to the outboard end 70 of closure 18 and extends through front frame 40 and into a conventional worm screw mechanism 72 secured such as by bolting to front frame 40. A conventional electric motor 74 is secured such as by bolting to front frame 40 with its output shaft 76 connected to worm gear mechanism 72; although a conventional electric motor 74 is preferred for supplying power to worm gear mechanism 72 other devices such as an air motor, hand crank, or others (not shown) may be used. The self-adjusting sealing apparatus of the present invention noted generally as numeral 78, to be explained in detail later, extends substantially the width of closure 18 and is secured to center frames 42 and 44 (FIG. 4) so that sealing elements 80 and 90 (FIG. 4) of apparatus 78 are in engagement with both sides of closure 18 and center frames 42 and 44 (FIG. 4) and are urged into engagement by a resilient retaining means noted generally by numeral 82 in FIG. 1 thereby sealing the spaces between the surfaces of closure 18 and center frames 42 and 44.

Figure 4:
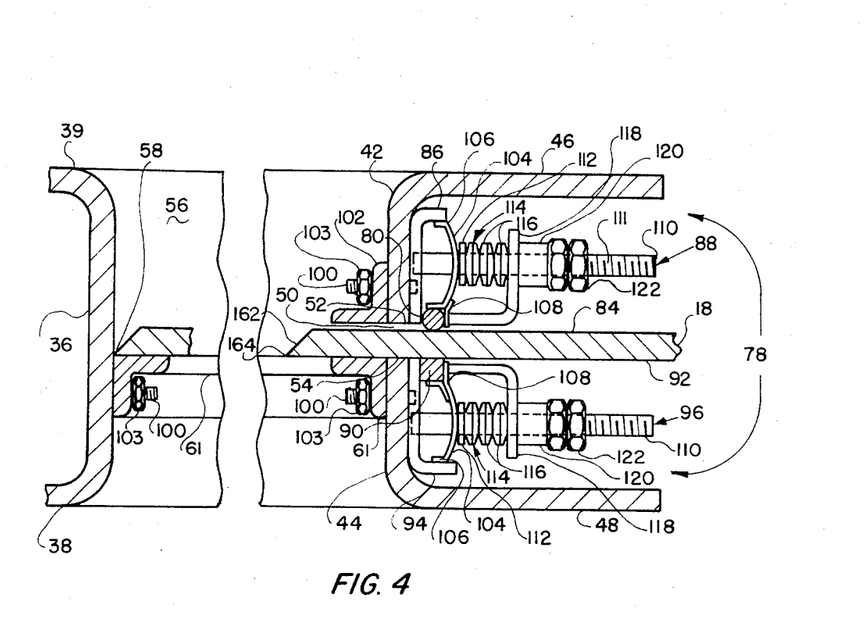
FIG. 4 is a side elevation in cross-section taken along the line A—A of FIG. 2 with the gas ducts removed showing on the right side the sealing apparatus with the closure in the open position and showing on the left side the closure in the closed position.

The fluid cut-off apparatus 12, with all its component parts, is placed between ducts 14 and 16 so that flange 20 of duct 14 is in contact with flanges 28 and 32 of side frames 24 and 26, flange 46 of center frame 42, and flange 39 of back frame 36 (FIG. 4) and flange 22 of duct 16 is in contact with flanges 30 and 34 of side frames 24 and 26, flange 48 of center frame 44 (FIG. 4) and flange 38 of back frame 36 (FIG. 4). All flanges are secured to each other by any suitable means, such as bolting, thereby defining an enclosure 56 between ducts 14 and 16 of substantially the same inside peripheral dimension as the inside peripheral dimension of ducts 14 and 16. By providing enclosure 56 with substantially the same inside peripheral dimension as ducts 14 and 16 the gas flow through enclosure 56 will remain substantially at the same rate as the flow through ducts 14 and 16 when closure 18 is in its fully opened position.

It is to be understood that for illustration purposes ducts 14 and 16 have been depicted as being square, but other shapes such as rectangular, circular, and oval ducts may be used. Should other shapes be used the fluid cut-off apparatus should also be shaped accordingly so that the enclosure defining the space between the ducts will be of substantially the same inside peripheral dimension as the ducts.

The self-adjusting sealing apparatus of the present invention noted generally as numeral 78 in FIG. 1 is shown in detail in FIGS. 2, 3, 4, and 5. For purposes of illustration and clarity the surfaces of elements facing toward the right in FIGS. 4 and 5 will be described as their outboard surfaces and surfaces facing toward the left will be described as their inboard surfaces.

Figure 2:
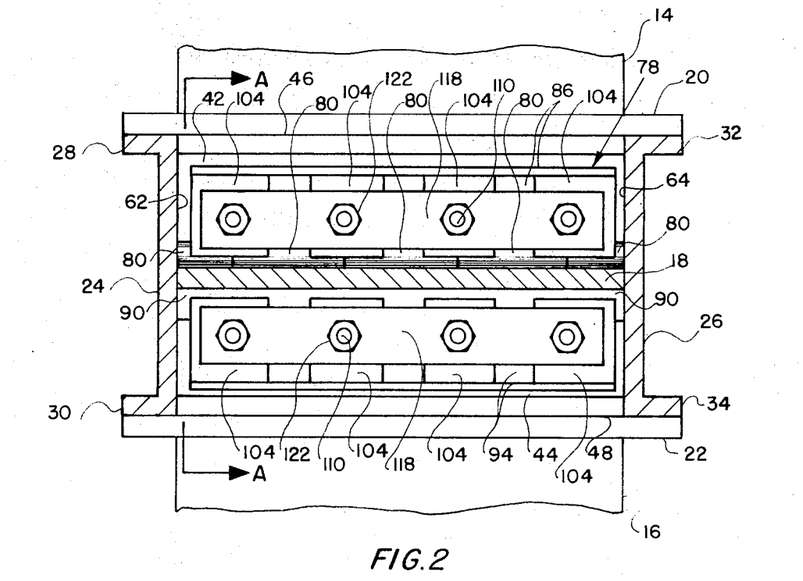
FIG. 2 is a front elevation in cross-section taken along the line II—II of FIG. 1 showing the side frames, the movable closure, and the sealing apparatus.

Referring now to FIGS. 2 and 4, the fluid cut-off apparatus 12 (FIG. 1) utilizes a single closure 18 to regulate the flow of gas through enclosure 56. The self-adjusting sealing apparatus 78 of FIGS. 2 and 4 generally comprises a sealing element 80, which extends the width of closure 18 (FIG. 2), and acts as shown in the top portions of FIGS. 2 and 4, against the outboard surface of center frame 42 and an irregular surface 84 on closure 18 for preventing a fluid from escaping from within enclosure 56 through the space 50 between the center frame 42 and the irregular surface 84 of closure 18. Part 86, to be described later, is attached to center frame 42 and for illustration purposes will be considered a part thereof when describing sealing elements 80 contacting center frame or wall 42. A resilient retaining mechanism noted generally as numeral 88 (in FIG. 4) urges sealing element 80 against the outboard surface of center frame 42 and against irregular surface 84 for constantly maintaining sealing element 80 in sealing engagement with center frame 42 and irregular surface 84 when closure 18 is moved into or out of enclosure 56 and when closure 18 is in its fully closed position, open position, or any position therebetween. The self-adjusting sealing apparatus 78, as shown in the lower portions of FIGS. 2 and 4, further includes a second sealing element 90 acting against center frame 44 and a second irregular surface 92 on closure 18 for preventing a fluid from within enclosure 56 from escaping between the center frame 44 and the second irregular surface 92. Part 94, to be described later, is attached to center frame 44 and for illustration purposes will be considered a part thereof when describing sealing element 90 contacting center frame or wall 44. A second resilient retaining mechanism noted generally by numeral 96 urges second sealing element 90 against center frame 44 and second irregular surface 92 for constantly maintaining second sealing element 90 in sealing engagement with center frame 44 and second irregular surface 92 when closure 18 is moved into and out of enclosure 56 and when closure 18 is in its fully closed position, open position, or any position therebetween.

More specifically, the self-adjusting sealing apparatus of the present invention as it is applied first to a fluid cut-off apparatus utilizing a single movable closure is illustrated in FIGS. 2 and 4.

The self-adjusting sealing apparatus 78 comprises a sealing element 80 extending substantially the width of closure 18 and acts against center frame 42 and an irregular surface 84 on closure 18 and a sealing element 90 extending substantially the width of closure 18 and acts against center frame 44 and an irregular surface 92 on closure 18. Sealing elements 80 and 90 comprise at least one rigid element, shown as element 90, that extends the entire width of closure 18 so that the laterally opposed ends of the element substantially abut surfaces 62 and 64 of side frames 24 and 26 thereby entirely sealing the spaces between center frames 42 and 44 and irregular surfaces 84 and 92 respectively when they are urged into sealing engagement by resilient retaining mechanisms 88 and 96. The preferred construction of the sealing elements is shown as sealing element 80. Sealing element 80 comprises a series of axially abutting rigid elements that extend the entire width of closure 18 thereby enabling each individual element to conform to irregularities in the irregular surface 84 of closure 18. The preferred shape of each individual axially abutting element 80 is cylindrical to enable each element 80 to have tangential contact with irregular surface 84. Although the aforementioned construction is the preferred construction of the sealing elements other types of construction may be utilized. One such type is shown as element 90 wherein the sealing element is a single rigid element rectangular in shape so that maximum seal surface contact is maintained with irregular surface 92. Another type, not shown, comprises a single rigid element cylindrical in shape. Another type, not shown, comprises a rectangular element 90 utilizing a series of abutting rigid elements that extend the width of closure 18. Another type of construction uses a flexible sealing element shown as sealing element 98 in FIGS. 3 and 5. Sealing element 98 comprises at least one flexible sealing element which extends the width of closure 18 and urged into sealing engagement by resilient retaining means 88 and 96. Sealing element 98 may be cylindrical in shape, not shown or rectangular in shape. Sealing element 98 may also be a single flexible element, not shown, extending the width of closure 18 or it may consist of a series of axially abutting flexible elements extending the width of closure 18. It should be understood that the various types of sealing elements used with the self-adjusting sealing apparatus shown is for illustration purposes only and that the same type of sealing elements selected should be used consistently with the self-adjusting sealing apparatus.

It is to be understood that the description of the construction of resilient retaining mechanisms 88 also includes the construction of mechanism 96 since both are identical.

Referring to FIGS. 2 and 4, self-adjusting sealing apparatus 78 further includes resilient retaining mechanisms 88 and 96 urging sealing elements 80 and 90 against center frames 42 and 44 and irregular surfaces 84 and 92 of closure 18 for maintaining sealing elements 80 and 90 in sealing engagement with center frames 42 and 44 and irregular surfaces 84 and 92 during movement of closure 18 into and out of enclosure 56.

Resilient retaining mechanisms 88 and 96 comprise rigid base plates 86 and 94 attached respectively to center frames 42 and 44 by any suitable means, for example, a threaded bolt 100 may be screwed into plates 86 and 94 which extends through center frames 42 and 44, through part 102, to be explained later, and support rail 61 and secured in place by retaining nut 103; rigid plates 86 and 94 preferably extend substantially the width of center frames 42 and 44 for supporting apparatus 78 in sealing engagement with center frames 42 and 44 and irregular surfaces 84 and 92; it is to be understood however, that plates 86 and 94 may also be a series of individual rigid base plates extending the width of center frames 42 and 44. A series of spaced flexible members 104 having an arcuate shape with one end supported by rigid base plate 86 and the other end 108 supporting sealing elements 80 and 90 extend substantially the width of closure 18 for urging sealing elements 80 and 90 against center frames 42 and 44 and irregular surfaces 84 and 92. A support bar 110 extends through each flexible member 104 at substantially its center and is attached to rigid base plates 86 and 94 such as by welding; each support bar 110 includes an external threaded portion 111 on its outboard end extending inboard a sufficient amount to allow a locking means, to be described later, to be threaded thereon. A washer 112 is placed over each support bar 110 so that its inboard surface rests against the outboard surface of each flexible member 104. A second flexible member noted generally by numeral 114 consisting preferably of a series of opposed belleville dished springs 116 are placed over support bar 110 and placed in contact with the outboard surface of washer 112; although the belleville dished springs 116 are the preferred items to be used as a second flexible member 116, other resilient means such as coiled springs, not shown, may be used. A rigid holding plate 118 extending substantially the width of closure 18 is placed at one end in contact with the outboard surface of second flexible member 114 with each support bar 110 extending therethrough and the other end of holding plate 118 is in contact with the first flexible member 104 at its seal retaining end 108 for maintaining sealing elements 80 and 90 against center frames 42 and 44 when closure 18 moves out of enclosure 56. A spacer 120 is placed on the outboard surface of holding plate 118 with support bar 110 extending therethrough for preventing belleville dished springs 116 from contacting and possibly getting lodged in threads 111 of support bar 110. A locking mechanism 122 which preferably consists of a jam nut arrangement as shown, is threaded on threads 111 of support bar 110 until they come in contact with the outboard surface of spacer 120; locking mechanism 122 is further tightened in order to compress belleville dished springs 116 thereby placing pressure on first flexible member 104 and compressing the same and thereby constantly urging sealing elements 80 and 90 against center frames 42 and 44 and irregular surfaces 84 and 92.

Figure 3:
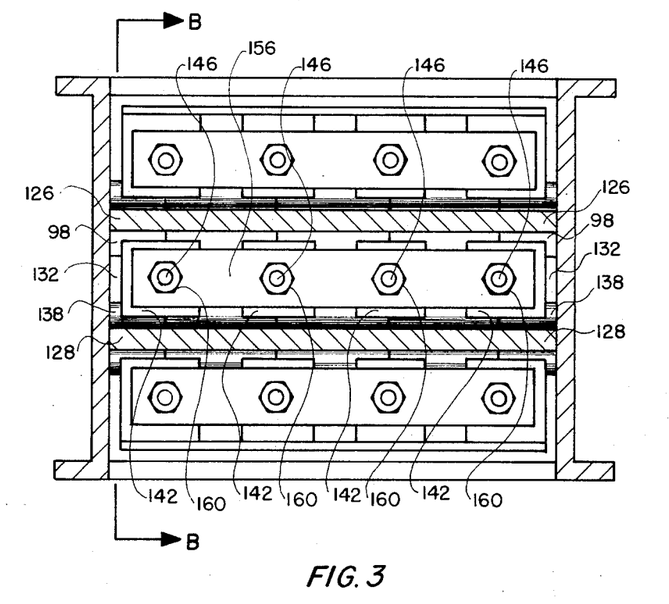
FIG. 3 is a front elevation in cross-section taken along a line II—II of an apparatus similar to that shown in FIG. 1 with the gas ducts removed but utilizing two movable closures instead of one showing the side frames, the movable closures, and the sealing apparatus.
Figure 5:
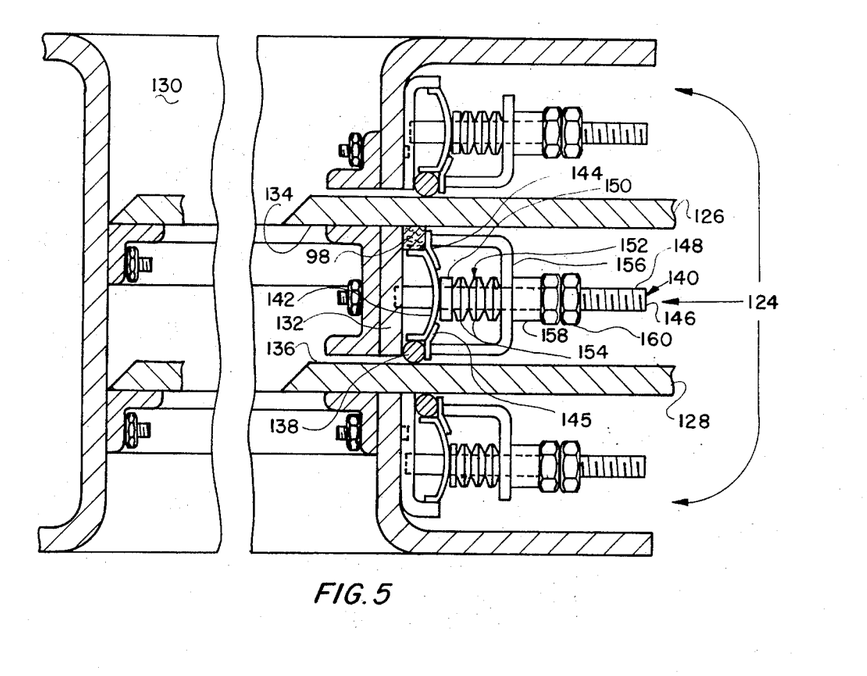
FIG. 5 is a side elevation in cross-section taken along the line B—B of FIG. 3 showing on the right side the sealing apparatus with both closures in the open position and showing on the left side both closures in the closed position.

Referring now to FIGS. 3 and 5 wherein a self-adjusting sealing apparatus 124 is applied to a fluid cut-off apparatus utilizing a pair of axially spaced closures 126 and 128 which are simultaneously movable into and out of an enclosure 130. A dual closure system is preferred where a gas to be closed off is extremely hot or toxic and any leakage around the closure and into the opposite duct system may cause injury to personnel working around the duct system that is supposed to be free of the hot or toxic gas. To insure that no hot or toxic gas seeps into the closed off duct system an inert gas such as helium, argon, and others may be injected into the space between the two closures at a higher pressure than the gas to be closed off thereby insuring that the hot or toxic gas will not seep into the opposite duct system.

In the self-adjusting sealing apparatus 124 (FIGS. 3 and 5) the upper one-third and the lower one-third portions are constructed the same as the self-adjusting sealing apparatus 78 (FIGS. 2 and 4) abovefore described and therefore will not be described further; only the center portion of self-adjusting sealing apparatus 124 will be now described.

Generally the center portion of self-adjusting sealing apparatus 124 is utilized for sealing spaces between the centermost frame 132 of enclosure 130 and sealing surfaces 134 and 136 on a pair of axially spaced closures 126 and 128 which are movable into and out of enclosure 130 and comprises a pair of sealing members 98 and 138 which act against center frame 132 and each sealing surface 134 and 136 thereby preventing a gas from within enclosure 130 from escaping between center frame 132 and sealing surfaces 134 and 136; and a resilient retaining mechanism noted generally as numeral 140 for urging sealing elements 98 and 138 against center frame 132 and against sealing surfaces 134 and 136, thereby maintaining sealing elements 98 and 138 in sealing engagement with center frame 132 and each sealing surface 134 and 136 when closures 126 and 128 move into and out of enclosure 130. It is to be understood that sealing elements 98 and 138 in actual operation are of the same material and configuration and are shown here as two different types of sealing elements for illustration purposes only.

More specifically, the center portion of self-adjusting sealing apparatus 124 comprises a pair of sealing elements 98 and 138 which are urged into sealing engagement against center frame or wall 132 and sealing surfaces 134 and 136 of closures 126 and 128 by resilient retaining mechanism 140; sealing elements 98 and 138 are of the same description, construction, and operation as sealing elements 80 and 90 of FIGS. 2 and 4 and therefore will not be described in further detail. A resilient retaining mechanism 140 comprising a series of spaced flexible members 142 having an arcuate shape and are located between closures 126 and 128 and extend substantially the width of closures 126 and 128 in which one end 144 urges sealing member 98 against center frame 132 and sealing surface 134 of closure 126 and the other end 145 urges sealing member 138 against center frame 132 and sealing surface 136 of closure 128. A support bar 146 extends through each flexible member 142 at substantially its center and is attached to center frame 132 such as by welding; each support bar 146 includes an externally threaded portion 148 on its outboard end extending inboard a sufficient amount to allow a locking means, to be described later, to be threaded thereon. A washer 150 is placed over each support bar 146 so that its inboard surface rests against the outboard surface of each flexible member 142. A second flexible member noted generally by numeral 152 consisting preferably of a series of opposed belleville dished springs 154 are placed over support bar 146 and placed in contact with the outboard surface of washer 150; although the belleville dished springs 154 are the preferred items to be used as a second flexible member 152 other resilient means, such as coiled springs, not shown, may be used. A rigid holding plate 156 extending substantially the width of closure 126 and 128 is placed in contact with the outboard end of each second flexible member 152 with each support bar 146 extending therethrough at substantially the center of its length, for conformity the width of holding plate 156 will be considered in the same direction as the width of closures 126 and 128 and the length of holding plate 156 will be considered in the direction along a perpendicular between closures 126 and 128, with one end of holding plate 156 in contact with the first flexible member 142 at its seal retaining end 144 and the other end of holding plate 156 in contact with the first flexible member 142 at its seal retaining end 145 for maintaining sealing elements 98 and 138 against center frame 132 when closures 126 and 128 move out of enclosure 130. If preferred, rigid holding plate 156 may be made in two pieces (not shown) extending substantially the width of closures 126 and 128 and each end of each piece which is not in contact with first flexible member 142 overlap each other so that the inboard end of one is in contact with the outboard surface of second flexible member 152 and the inboard end of the other holding plate overlaps and is in contact with the outboard end of the first holding plate with each support bar 146 extending through each holding plate. A spacer 158 is placed on the outboard surface of holding plate 156 with support bar 146 extending therethrough for preventing belleville dished springs 154 from contacting and possibly getting lodged in threads 148 of support bar 146. A locking mechanism 160 which preferably consists of a jam nut arrangement, as shown, is threaded on threads 148 of support bar 146 until they come in contact with the outboard surface of spacer 158; locking mechanism 160 is further tightened in order to compress belleville dished springs 154 thereby placing pressure on first flexible member 142 and compressing the same and thereby constantly urging sealing elements 98 and 138 against center frame 132 and sealing surfaces 134 and 136.

The operation of the fluid cut-off apparatus 12 will be directed toward the type utilizing a single closure 18, but it should be understood that the operation equally applies to the operation of a dual closure system.

Referring to FIGS. 1, 2 and 4, motor 74 is energized to rotate shaft 76 in the proper direction to either open or close closure 18. Shaft 76 in turn rotates a worm gear mechanism 72 that is engaged with jackscrew 68 which is not allowed to rotate, therefore, when the worm screw is rotated, jackscrew 68 is propelled in a direction parallel to enclosure 56. Since jackscrew 68 is connected to closure 18, closure 18 will be moved into or out of enclosure 56. Closure 18 is supported by and travels along the side rails 60. As closure 18 enters enclosure 56, it will encounter waste build up on support rail 61 due to the polluted gas flowing through enclosure 56, it is therefore desirable to taper to a point the forward end 162 of closure 18 so that a knife edge 164 will cut through the waste as closure 18 travels into enclosure 56 thereby maintaining closure 18 in contact with support rail 61. A second support member 102 is attached to the inside surface of center frame 42 by screw 100 and nut 103 and aligned parallel to surface 52 of center frame 42. The purpose of support member 102, in addition to securing rigid base plate 86 to center frame 42, is to help maintain closure 18 in contact with support rail 61 as it first enters enclosure 56.

As closure 18 moves into and out of enclosure 56, sealing elements 80 and 90 are in contact with irregular surfaces 84 and 92. As a ridge contacts sealing element 80 and 90, which are of the preferred construction that is, a series or rigid cylindrical abutting elements extending the width of closure 18, the ridge will push the individual element against flexible member 104 causing it to flex and push against the belleville dished springs 116 and compress the same thereby permitting the sealing element 80 or 90 to ride over the ridge in the irregular surface. As the ridge passes sealing element 80 or 90 the compressed belleville dished springs 116 will push against flexible member 104 which will push against sealing member 80 or 90 causing it to ride down the ridge and thus remain in constant contact with the irregular surface. When a depression or valley passes beneath sealing element 80 or 90 the precompressed belleville dished springs 116 will push against flexible member 104 which in turn will drive sealing element 80 or 90 into the depression and when sealing element 80 or 90 come out of the depression it will push against flexible member 104 flexing the same and thereby compressing belleville dished springs 116 and allowing sealing elements 80 and 90 to come out of the depression.

When closure 18 is being moved out of the enclosure 56 and an unusually deep depression, an unusually high ridge, or an unusually large waste particle contacts sealing element 80 or 90 it will have the tendency to try and push the sealing element 80 or 90 away from center frame 42 or 44, allowing polluted gas to escape to the atmosphere, and will cause flexible member 104 to deform rather than flex. To counteract this deforming tendency rigid holding plate 118, which is not flexible and not subject to deflection is used and will hold sealing element 80 or 90 in engagement against center frames 42 and 44 and force sealing element 80 or 90 to ride over the irregularity.

As the preferred construction of self-adjusting sealing apparatus 78 contains a series of axially abutting cylindrical rigid elements 80 being held in engagement by a series of flexible members 104 it lets each individual sealing element 80 ride over a ridge, waste particle, or through a depression without effecting the sealing engagement of any other individual sealing element 80. This individual action by each sealing element 80 will insure that the space between center frames 42 and 44 and irregular surfaces 84 and 92 are adequately sealed at all times.

The foregoing has presented a novel self-adjusting sealing apparatus which is capable of minimizing the amount of polluted gas that may escape from within a duct system to the atmosphere through spaces created when an irregular closure gate is moved into and out of the duct system for regulating the flow of gas through the duct system.

Accordingly, the invention having been described in its best embodiment and mode of operation, that which is desired to be claimed by Letters Patent is:

I claim:

1. Fluid cut-off apparatus for a gas conduit, comprising:
    a pair of axially abutting conduits defining a space therebetween;
    an enclosure means connecting said conduits and closing said space to surrounding atmosphere,
    said enclosure means including an opening substantially perpendicular to said conduits and in alignment with said space;
    a closure means in said opening movable into said space for preventing passage of fluid from one of said conduits to the other;
    a first sealing means acting against a wall of said enclosure means and against an adjacent first surface on said closure means;
    a second sealing means acting against said wall of said enclosure means and against an adjacent second surface on said closure means opposite to said first surface;
    each said first and second sealing means being distinct and separate and preventing the escape of substantial amounts of said fluid from within said enclosure means between said wall and said first and second surfaces;
    said first and second sealing means each including at least one sealing element extending the width of said first and second surfaces respectively; and
    a plurality of resilient retaining means mounted on said wall and equally spaced along the width of said first and second surfaces for continuously urging said first and second sealing means against said wall and against said first and second surfaces to reduce the escape of said fluid between said first and second sealing means and said first and second surfaces.

2. The fluid cut-off apparatus of claim 1 wherein said first and second sealing means each include a series of axially abutting rigid elements extending the width of said first and second surfaces respectively enabling said first and second sealing means to substantially conform to irregularities in said first and second surfaces.

3. The fluid cut-off apparatus of claim 2 wherein said rigid elements are cylindrical in shape for tangential contact with said first and second surfaces.

4. The fluid cut-off apparatus of claim 2 wherein said rigid elements are rectangular in shape for providing substantial surface contact with said first and second surfaces.

5. The fluid cut-off apparatus of claim 2 wherein each of said resilient retaining means acts on adjacent pairs of said axially abutting rigid elements for allowing each of said rigid elements to substantially conform to irregularities in said first and second surfaces.

6. The fluid cut-off apparatus of claim 1 wherein said first and second sealing means each include at least one flexible sealing element extending the width of said first and second surfaces respectively and urged into sealing engagement therewith by said resilient retaining means.

7. The fluid cut-off apparatus of claim 6 wherein said first and second sealing means each include a series of axially abutting flexible elements extending the width of said first and second surfaces respectively enabling said first and second sealing means to substantially conform to irregularities in said first and second surfaces.

8. The fluid cut-off apparatus of claim 1 wherein each of said resilient retaining means includes;
  a rigid base means connected to said enclosure means for supporting said sealing means in sealing engagement with said wall and said surfaces;
  a first flexible element having a first end supported by said base means and a second end supporting said sealing means for urging said sealing means against said wall and said surfaces; and
  a support means extending through said first flexible element at substantially its center and attached to said base means for maintaining said first flexible element in contact with said sealing means and for maintaining said sealing means in sealing engagement with said wall and said surfaces when said closure means is moved into and out of said enclosure means.

9. The fluid cut-off apparatus of claim 8 wherein said resilient retaining means further includes a second flexible element in contact with an outboard surface of said fluid flexible element at substantially its center with said support means extending therethrough for urging said first flexible element against said sealing means thereby urging said sealing means against said wall and said surfaces.

10. The fluid cut-off apparatus of claim 9 wherein said resilient retaining means further includes a rigid holding means attached at one end to an outboard end of said second flexible element with said support means extending therethrough and the other end of said holding means in contact with said first flexible element at its seal retaining end for maintaining said sealing means against said wall when said closure means moves out of said enclosure means.

11. The fluid cut-off apparatus of claim 10 wherein said resilient retaining means further includes;
  an external threaded portion on an outboard end of said support means;
  a spacer means placed on an outboard surface of said holding means with said support means extending therethrough for preventing said second flexible element from contacting said threads of said support means, and
  a lock means threaded on said threads of said support means and tightened against an outboard surface of said spacer means for maintaining said first and second flexible elements in compression thereby constantly urging said sealing means against said wall and said surfaces.

12. Fluid cut-off apparatus for a gas conduit, comprising:
  a pair of axially abutting conduits defining a space therebetween;
  an enclosure means connecting said conduits and closing said space to surrounding atmosphere,
  said enclosure means including a pair of axially spaced openings substantially perpendicular to said conduits and in alignment with said space;
  a first closure means in one of said openings movable into said space for preventing passage of fluid from one of said conduits to the other;
  a second closure means in the second of said openings movable into said space substantially simultaneously with said first closure means for preventing passage of said fluid from one of said conduits to the other;
  a first sealing means acting against a wall of said enclosure means and against an adjacent first surface on said first closure means;
  a second sealing means acting against said wall of said enclosure means and against an adjacent second surface on said first closure means opposite to said first surface,
  a third sealing means acting against said wall of said enclosure means and against an adjacent first surface on said second closure means;
  a fourth sealing means acting against said wall of said enclosure means and against an adjacent second surface on said second closure means opposite to said first surface;
  each of said sealing means being distinct and separate and preventing the escape of substantial amounts of said fluid from within said enclosure means between said wall and said first and second surfaces of said first and second closure means;
  said sealing means each including at least one sealing element extending the width of said first and second surfaces of said first and second closure means;
  a plurality of first resilient retaining means mounted on said wall and equally spaced along the width of said first surface of said first closure means for continuously urging said first and fourth sealing means against said wall and against said first and second surface of said first closure means respectively; of said first closure means;
  a plurality of second resilient retaining means mounted on said wall and equally spaced along the width of said first and second closure means for simultaneously urging said second and third sealing means against said wall and against said second and first surfaces of said first and second closure means respectively; and plurality of third resilient retaining means mounted on said wall and equally spaced along the width of said second surface of said second closure means for continuously urging said fourth sealing means against said wall and against said second surface of said second closure means; and
  said first second third resilient retaining means reducing the escape of said fluid between all of said sealing means and said first and second surfaces of said first and second closure means.

13. The fluid cut-off apparatus of claim 12 wherein each of said sealing means includes a series of axially abutting rigid elements extending the width of each of said sealing surfaces respectively enabling each of said sealing means to conform to irregularities in each of said sealing surfaces.

14. The fluid cut-off apparatus of claim 13 wherein said rigid elements are cylindrical in shape for tangential contact with each of said sealing surfaces.

15. The fluid cut-off apparatus of claim 13 wherein said rigid elements are rectangular in shape for providing substantial surface contact with each of said sealing surfaces.

16. The fluid cut-off apparatus of claim 12 wherein each of said sealing means includes at least one flexible sealing element extending the width of each of said sealing surfaces and urged into sealing engagement therewith by each of said resilient retaining means.

17. The fluid cut-off apparatus of claim 16 wherein each of said sealing means includes a series of axially abutting flexible elements extending the width of each of said sealing surfaces enabling each of said sealing means to conform to irregularities in each of said sealing surfaces.

18. The fluid cut-off apparatus of claim 12 wherein said second resilient retaining means includes;
   a first flexible element between said first and second closure means, one end thereof urging said second sealing means against said wall and said second sealing surface of said first closure means and the other end thereof urging said third sealing means against said wall and said first sealing surface of said second closure means; and
   a support means extending through said first flexible element at substantially its center and attached to said enclosure means for maintaining the ends of said first flexible element in contact with said second and third sealing means.

19. The fluid cut-off apparatus of claim 18 wherein said second resilient retaining means further includes a second flexible element in contact with an outboard surface of said first flexible element at substantially its center with said support means extending therethrough for urging said first flexible element against said second and third sealing means thereby urging said second and third sealing means against said wall and said second and first sealing surfaces of said first and second closure means respectively.

20. The fluid cut-off apparatus of claim 19 wherein said second resilient retaining means further includes a rigid holding means attached to an outboard end of said second flexible element at substantially its center with said support means extending therethrough, and with each end of said holding means in contact with each end of said first flexible element for maintaining said second and third sealing means against said wall when said first and second closure means moves out of said enclosure.

21. The fluid cut-off apparatus of claim 20 wherein said second resilient retaining means further includes;
   an external threaded portion on an outboard end of said support means;
   a spacer means placed on an outboard surface of said holding means with said support means extending therethrough for preventing said second flexible element from contacting said threads of said support means; and
   a lock means threaded on said threads of said support means and tightened against an outboard surface of said spacer means for maintaining said first and second flexible elements in compression thereby continually urging said second and third sealing means against said wall and said second and first sealing surfaces of said first and second closure means respectively.

* * * * *